United States Patent Office 2,720,750
Patented Oct. 18, 1955

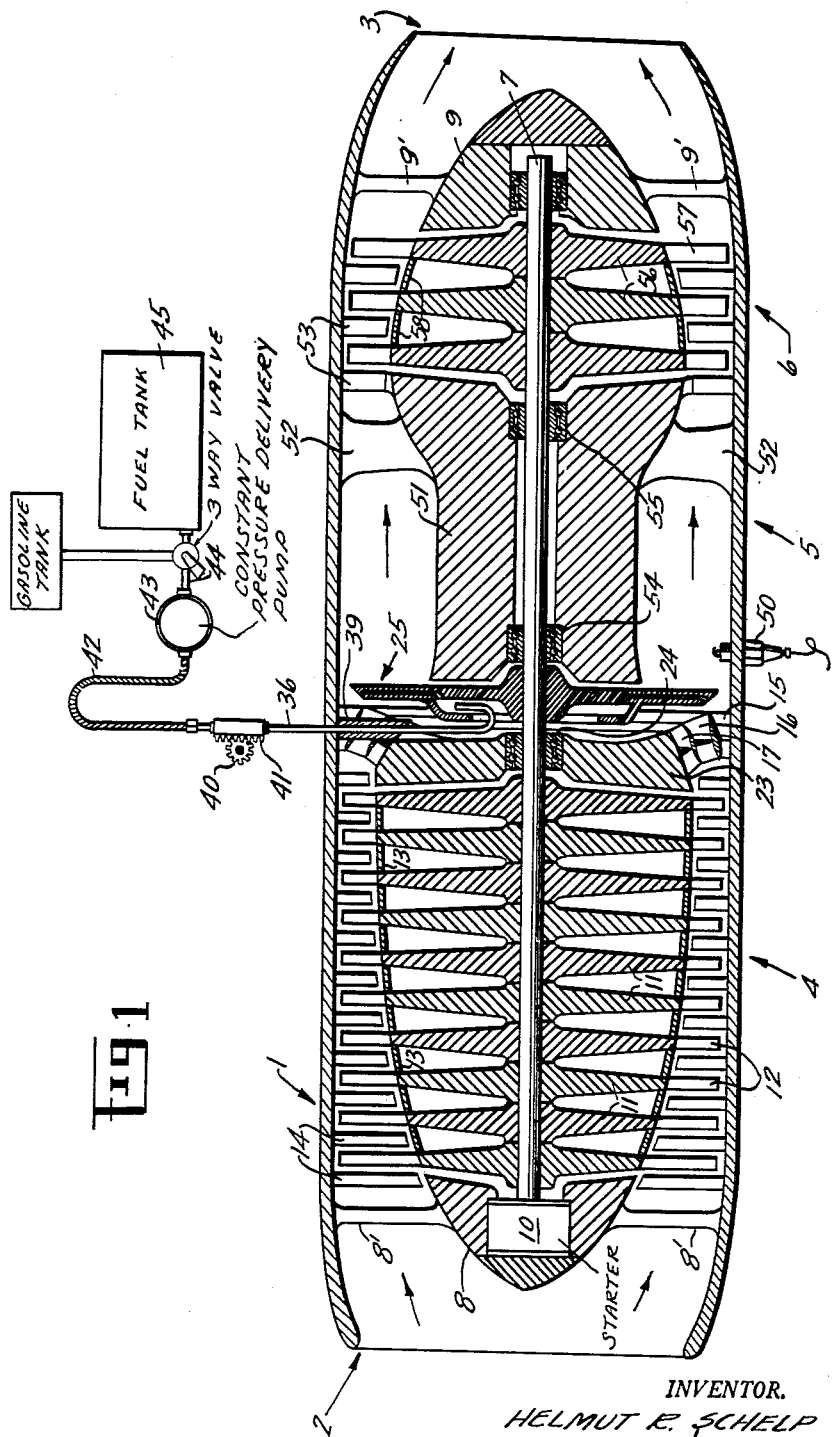

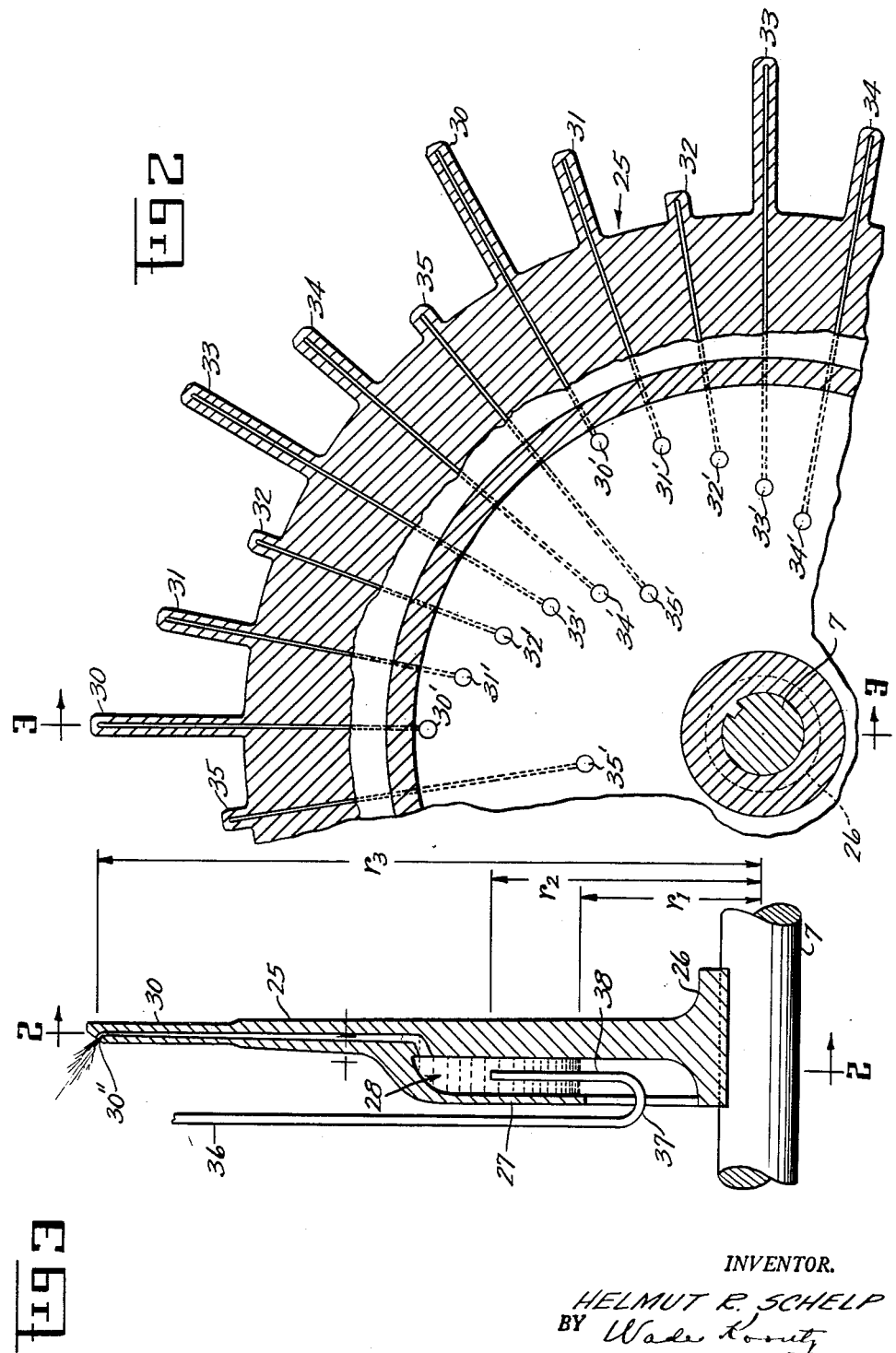

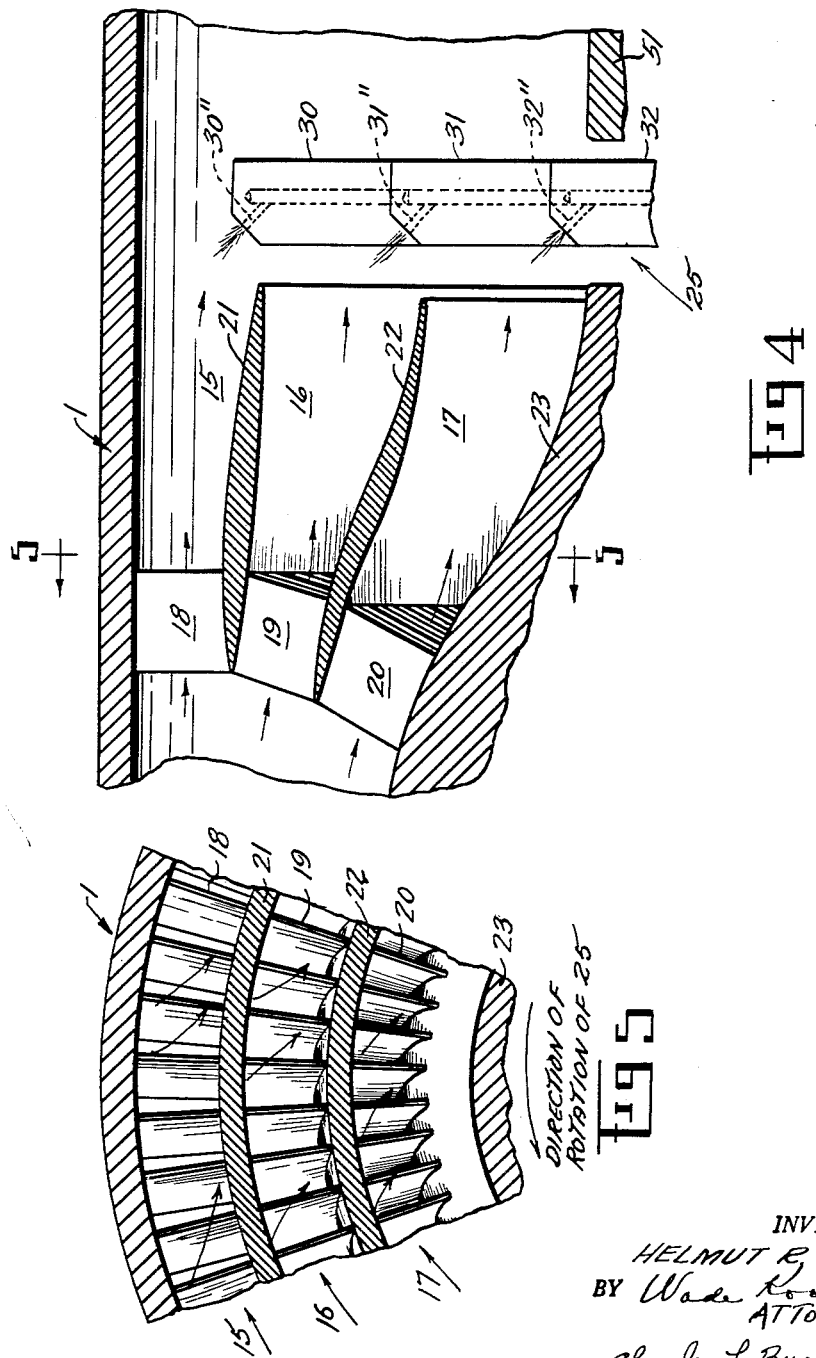

2,720,750

REVOLVING FUEL INJECTION SYSTEM FOR JET ENGINES AND GAS TURBINES

Helmut R. Schelp, Patterson Field, Ohio, assignor to the United States of America as represented by the Secretary of the Air Force Application November 4, 1947, Serial No. 783,886

14 Claims. (Cl. 60—35.6)

(Granted under Title 35, U. S. Code (1952), sec. 266)

The invention described herein may be manufactured by or for the United States Government for governmental purposes without payment to me of any royalty thereon.

The present invention relates to a revolving fuel injection system for jet engines, gas turbines and general application where high heat output is required.

The primary object of the invention is to provide a fuel distributing rotor mounted within a jet engine or gas turbine and operated by the main shaft of the engine to distribute liquid fuel in the combustion chamber of the engine or turbine under centrifugal pressure induced by rotor rotation.

A further object of the invention is to provide a fuel distributing system for a jet engine or gas turbine including a rotor mounted in or adjacent to the combustion chamber of the engine and having an annular fuel containing cavity connecting with peripheral nozzles fixed on the rotor. In a revolving fuel injection system of this kind, it is a related object to provide a relatively stationary fuel feed pipe which is arranged to deliver fuel to the fuel containing cavity of the rotor and to provide means for adjusting the radial position of the pipe in such a manner as to regulate the fuel injection pressure whereby the power output of the engine may be regulated at the same time.

Another object of the invention is to provide a jet engine or gas turbine in which the fuel burning efficiency is increased by the use of an improved fuel distributing system and in which as a result of the improved fuel distributing system the combustion of the fuel is completed before the fuel-air mixture reaches the turbine blades.

Another object of the invention is to provide a jet engine or gas turbine having an improved fuel injection system capable of delivering as well as efficiently distributing such quantities of fuel as to give high performance of the engine or turbines when demanded. At the same time it is an object of the invention to provide a flexible fuel injection system which is capable of adjustment to vary the rate of fuel flow between fairly wide limits.

Another object of the invention is to generally improve the construction and operating efficiency of jet engines and gas turbines. A related object is to provide an improved high-output propulsion unit for high-speed aircraft.

Another object of the invention is to provide a revolving fuel injection system of general application capable of efficiently distributing liquid fuel within a combustion chamber, and adapted by its construction to exercise close control over the rate of fuel flow.

The above and other objects of the invention will become apparent on reading the following detailed description in conjunction with the drawings wherein:

Fig. 1 is a central longitudinal cross sectional view of a jet engine embodying a revolving fuel injection system arranged in accordance with the present invention.

Fig. 2 is a transverse cross sectional view of a portion of the fuel distributing rotor of the present invention as taken on the line 2—2 of Fig. 3.

Fig. 3 is a cross sectional view of a portion of the fuel distributing rotor as taken on line 3—3 of Fig. 2 but including the fuel feed pipe not seen in Fig. 2.

Fig. 4 is a partial longitudinal cross sectional view of the jet engine illustrating in detail the arrangement of air guide rings and vanes as well as a portion of the fuel distributing rotor situated at the entrance end of the combustion chamber.

Fig. 5 is a partial transverse cross sectional view of the jet engine taken on line 5—5 of Fig. 4.

For purposes of illustration the present revolving fuel injection system has been shown on a jet engine (Fig. 1), although it is capable of general application particularly on the broad class of propulsion units known as combustion gas turbines. The increasing use of this class of propulsion units on aircraft is due to the many inherent advantages thereof, which have been amply set out in "Gas Turbines and Jet Propulsion for Aircraft" by G. Geoffrey Smith (fourth edition—1946), see particularly page 20. The propulsion unit chosen for illustration of the invention is more correctly known as a turbo-jet engine, since it embodies the continuous turbine-compressor arrangement sometimes referred to as the Whittle system.

The ratio of fuel flow for a jet engine is the ratio of the fuel flow rate at a specified altitude and idling engine speed to the fuel flow rate at sea level, at maximum speed and at lowest outside temperature. In present day jet engines this ratio is in the neighborhood of 1 to 5. However to meet future requirements for high altitude flying combined with maximum jet thrust for take-off the fuel ratio may be required to run as high as 1 to 25. These future requirements cannot be met by the use of a simple high pressure fuel injection system using stationary nozzles for injection and atomization of the liquid fuel.

For a description of the present revolving fuel injection system reference is made to Fig. 1 in which there is shown a turbo-jet engine suitable for use on aircraft. The engine includes a cylindrical casing or housing 1 which is of circular cross section and has an inlet end or intake 2 and an outlet end or discharge nozzle 3. Proceeding from the inlet end to the outlet end the casing contains three main elements namely the air compressor 4, combustion chamber 5 and gas turbine 6. Air compressed by the compressor 4 is used to support combustion of liquid fuel in the chamber 5 and the increased volume of heated gases is then fed through the turbine and thence outwardly through the discharge nozzle 3 to give the reaction effect which produces movement of the propulsion unit in a direction opposite to that of the issuing stream of hot gases. The purpose of the turbine is to drive the air compressor 4, by means of the main shaft 7 connecting the rotor assembly of the turbine with the rotor assembly of the air compressor.

The main shaft 7 of the engine is supported in anti-friction bearings carried within a nose bearing housing 8 and a tail bearing housing 9. The housings 8 and 9 are supported on the central axis of the engine by means of arms 8' and 9' respectively, which are welded or otherwise secured in place as shown. The shaft bearing in the housing 8 is mounted within and forms part of a starter 10, which may be an electric motor or any suitable compact source of motive power. The starting speed need not be high but with the present system of fuel injection it is suggested that starting speed be between one-tenth and one-eighth of idling speed. As soon as combustion is taking place in the chamber 5 the engine speed will increase and at this time the starter 10 should be turned off or disengaged to prevent unnecessary drag during the engine warm-up period. The air compressor 4 comprises a rotor assembly having a series of rotor elements 11 fixed on the shaft 7 and joined at the base of the rotor vanes 12 by the shroud rings 13. The vanes 12, which decrease in length as the air becomes more compressed, are preferably of the conventional concave cross sectional shape such as for instance shown in Figure 3 of the U. S. Patent 2,360,130 to Heppner and are arranged to force the air forwardly past the stationary guide vanes 14 into impinging relation with respect to the next set of rotor vanes or blades. This staging of the compression process acts to gradually increase the static pressure of the air so that as it flows past the last set of stationary guide vanes 14 it will be under fairly high static pressure, part of which may be utilized to build up the velocity of the air issuing into the combustion chamber 5. The air enters the chamber 5 by way of the annular expansion passages 15, 16 and 17, which act to distribute the rapidly moving air throughout the combustion chamber 5 in an orderly manner. Since the passages 15, 16 and 17 increase in depth as the air passes rearwardly, this portion of the engine may be termed the expansion chamber. The structural details of this chamber may best be understood by referring to Figs. 4 and 5, wherein may be seen three sets of annularly arranged guide vanes 18, 19 and 20 located within the annular passages 15, 16 and 17 respectively. The outermost set of guide vanes 18 is attached to the engine casing 1 and to a shroud ring 21, the intermediate set of guide vanes 19 is attached to the shroud rings 21 and 22, and the innermost set of guide vanes 20 is attached to the shroud ring 22 and to a stationary disk-like partition 23. The individual guide vanes of the sets 18, 19 and 20 are preferably curved in cross section so as to impart a whirling or rotary motion to the air passing into the combustion chamber 5. Furthermore the degree of curving in the vanes increases from the outermost set 18 to the innermost set 20, thus giving a greater twist to the air nearer the center of the combustion chamber to throw the air outwardly by centrifugal force and cause it to mix more thoroughly. While the rotary motion given to the air by the sets of vanes 18, 19 and 20 tends to reduce its velocity, this motion is an aid to more efficient combustion of the liquid fuel. The disk-like partition 23 is apertured at its center to receive an antifriction bearing 24 which provides additional support for the main shaft 7. The disk 23, vanes 18, 19 and 20 and shroud rings 21 and 22 form a rigid and unitary structure which is secured in fixed position in the casing 1 as shown.

The rapidly moving air having a whirling motion imparted by the sets of guide vanes 18, 19 and 20 passes from the expansion chamber into the combustion chamber 5 and in so doing must flow past the revolving fuel injection system, or apparatus. This apparatus comprises a fuel distributing rotor 25 mounted on the main shaft 7 so as to turn therewith. As may be seen in Figs. 2 and 3 the rotor 25 includes a hub 26 integral with the rotor and spaced from the rotor is an annular wall 27 having its outer rim integrally attached to the rotor, thus proving an annular fuel containing cavity 28 within the rotor. Evenly distributed around the outer periphery of the rotor 25 there are a plurality of fuel injection nozzles 30, 31, 32, 33, 34 and 35. These nozzles form a group having fuel passages leading thereto from a series of inlet ports 30′, 31′, 32′, 33′, 34′ and 35′ which open into the fuel containing cavity 28 at varying radial distances from the main shaft 7. It will be appreciated that liquid fuel will be retained in the cavity 28 by centrifugal force and will feed into the fuel passages by the same force. The illustrated arrangement of fuel inlet ports and fuel injection nozzles is not merely arbitrary but has been found to possess certain advantages. For example, assuming that the rate of fuel flow is such that only enough fuel is in the cavity 28 to fill the space from the ports 30′ to the ports 33′, then nozzles 34 and 35 will not function and there will be less heat developed near the inside wall of the combustion chamber than near the outside wall. However with the air having a greater whirling action toward the inner wall, it will be thrown outwardly very readily due to its greater density. This excess air will promote thorough combustion of the injected fuel and will also help to cool the casing 1. As another example, assume that at idling speed there will be only enough fuel in the cavity 28 to completely cover the inlet ports 30′. As a result only the nozzles 30 will function and combustion in the chamber 5 will be mostly near the outer wall. The cooler air near the inner wall, having a greater whirling action, will be thrown outwardly by centrifugal force to mix thoroughly with the heated air and gases. Thus the air and products of combustion reaching the turbine 6 will be of uniform temperature throughout. It is also true that the illustrated arrangement of fuel inlet ports makes possible the regulation of the fuel flow rate, according to the amount of fuel in the cavity 28 at any instant.

In order to feed liquid fuel to the rotor 25 there is provided a fuel feed pipe 36, which has a return bend 37 at the lower end thereof which connects with an upwardly extending delivery portion 38. The pipe 36 is slidably mounted in a guide sleeve 39 extending through the shroud rings 21 and 22 and secured thereto. The radial position of the feed pipe 36 is adapted to be varied or adjusted by means of a rotatably mounted pinion 40 which meshes with a gear rack 41 rigidly secured on the pipe 36. At its upper end the pipe 36 is connected to a flexible tube 42 coupled to a low-pressure delivery pump 43, the pump in turn being connected by a conduit 44 with the fuel tank 45. The liquid enters the fuel containing cavity 28 of the rotor 25 from the delivery portion 38 of the feed pipe 36 and at least a part of the pipe is immersed in the fuel which collects in cavity 28. The fuel in the cavity is retained against the outer circumference thereof by centrifugal force, and is also free to flow to the nozzles under the influence of centrifugal force. The fuel nozzles 30 to 35 are arranged in groups as shown and it should be understood that similar groups of nozzles are arranged as shown completely around the rotor, which except for the nozzles protruding therefrom has a uniform radius throughout its circumference. The fuel feeds to the nozzles by means of the ports 30′ to 35′ and also passages of small caliber formed within the rotor and nozzles. These passages connect with nozzle jets such as indicated at 30″, 31″ and 32″ in Fig. 4. These jets are preferably turned at such an angle with respect to the nozzles as to cause the fuel to be injected into the air stream counter to the direction of flow thereof. This arrangement functions to cause better mixing of the fuel and air. This feature along with the feature of rapid rotation of the rotor 25 brings about complete combustion of the fuel within the combustion chamber 5, and not in the turbine or in the atmosphere rearwardly of the engine. The reason for completing the combustion in the chamber 5 is so that the rapid expansion of the products of combustion and of the excess air which is always present will take place before the gases reach the gas turbine and before they are expelled rearwardly from the engine. Combustion in the atmosphere rearwardly of the engine will obviously represent almost a dead loss, but it is to be understood that there may be instances where some combustion occurs in the turbine under conditions of very high rates of fuel flow. In order to start the combustible mixture of fuel and air burning a spark plug 50 is provided as shown (Fig. 1), but this is supplied from a source of high tension electricity only until the engine is started. After the mixture of air and fuel is burning the flame continues to propagate itself from the liquid fuel and air continuously supplied to the combustion chamber 5.

The combustion chamber 5 is an annular space between the engine casing 1 and a circular filler member 51. The member 51 is supported in stationary relation within the casing by means of arms 52 and a series of fixed turbine vanes 53 having their inner ends secured on the filler member 51. Additional bearings 54 and 55 are provided for the main shaft 7 at each end of the member 51. The annular space forming the combustion chamber narrows down toward the turbine 6 in order to accelerate the flow of high temperature gases entering the turbine. The heat evolved in the combustion of the fuel causes rapid expansion of the products of combustion and of the excess air, and the result is a large volume of gas at high temperature to drive the turbine 6 and also for producing thrust reaction to push the engine forwardly through the surrounding atmosphere.

The gas turbine 6, the function of which is to drive the air compressor 4 and the fuel distributing rotor 25, comprises a series of rotor elements 56 fixed on the shaft 7 and joined at the base of the rotor vanes or blades 57 by shroud rings 58. The vanes 57, which increase in length toward the rear of the engine as the gases lose some of their velocity head, are preferably of concave cross sectional shape and are arranged to be driven forwardly as the gases are directed thereagainst by the stationary guide vanes 53 secured to the casing 1. The hot gases pass from the casing into the atmosphere, the discharge nozzle 3 narrowing down the diameter of the casing to cause some acceleration of the gases as they pass out of the engine casing. It should be noted too that the nozzle 3 is more or less annular in cross section because of the tail bearing housing 9 which extends rearwardly to fill the central portion of the casing at the discharge end thereof.

Having described the structure and general principles of operation of the jet engine, the revolving fuel injection system will now be described in more detail with particular reference to Figs. 1, 2 and 3. The present revolving fuel injection system makes possible a jet engine or gas turbine having numerous advantages, such as:

(1) More efficient combustion of fuel results in increased overall efficiency of the engine.

(2) More efficient combustion of fuel makes possible higher ratio of fuel flow without noticeable reduction in the engine efficiency.

(3) More efficient combustion of fuel makes possible a reduction in the length of the combustion chamber thus providing a more compact propulsion unit.

(4) Adjustability of the rate of fuel flow provides a convenient means of controlling power output.

(5) More uniform distribution of fuel results in a more uniform distribution of the heat evolved in combustion of the fuel and consequently less danger of structural failure due to localized overheating.

(6) The direct drive of the fuel distributing rotor results in better fuel distribution as the engine speed increases to thus provide efficient combustion at the higher rates of fuel flow.

(7) The injection of fuel by centrifugal force automatically raises injection pressure as the fuel density is increased, this being important in changing from one type of fuel to another.

The revolving fuel injection system comprises chiefly the fuel distributing rotor 25 and the adjustable fuel feed pipe 36. The rotor as illustrated (Fig. 2) includes a total of thirty-six fuel injection nozzles arranged in consecutive groups of six. This arrangement is only for the purpose of illustration, it being clear that other arrangements both in number of nozzles and the relative length and location thereof may be used according to choice. In any case it is usually desirable that the fuel should be injected in a counterflow direction directly into the streams of air issuing from the air compressor, or from the expansion chamber between the compressor 4 and rotor 25. It is suggested that since the air from the sets of guide vanes 18, 19, and 20 approaches the rotor 25 at an angle less than ninety degrees, the nozzles of streamline cross section be arranged with their principal cross sectional axes at a small angle (usually not more than thirty degrees) with respect to the plane of the rotor. The nozzle tips 30" to 35" as illustrated are merely provided with straight open passages, but if desired various other kinds of nozzle tips may be substituted. It might be noted also (see Fig. 4) that the successive nozzles arranged around the rotor 25 are of three different lengths in order to inject fuel directly into the three separate layers of air which issue from the expansion passages 15, 16 and 17.

In order to demonstrate the function of the adjustable fuel feed pipe 36 it should be noted that according to Bernoulli's theorem and the continuity of fluid flow the following equation may be derived:

$$P - P_1 = k(u_3^2 - u_1^2)$$

where:

P is the liquid injection pressure at the fuel distributing nozzle (30" in Fig. 3).

$P_1$ is the liquid pressure at the inner surface of the liquid in cavity 28, or at radius $r_1$.

$k$ is a constant depending on the density of the liquid fuel.

$u_3$ is the circumferential velocity at radius $r_3$.

$u_1$ is the circumferential velocity at radius $r_1$.

Since the quantities $P_1$ and $u_3$ will be constant at constant rotor speed it follows that a reduction in $u_1$ and $r_1$ will result in an increase in P, the liquid injection pressure. Thus if the quantity $r_1$ is reduced the injection pressure will automatically increase.

In order to show how adjustment of the pipe 36 will change the quantity $r_1$ the above equation is again stated as follows:

$$P_2 - P_1 = k(u_2^2 - u_1^2)$$

where:

$P_2$ is the liquid pressure at the end of the delivery portion 38 of pipe 36, or at radius $r_2$.

$u_2$ is the circumferential velocity at radius $r_2$.

Since the quantity $P_2 - P_1$ is a constant at constant rotor speed it follows that a reduction of $r_2$ must be accompanied by a reduction of $r_1$. In other words moving the pipe 36 toward the shaft 7 will decrease $r_2$ and $r_1$. However as proven above a decrease of $r_1$ causes an increase in the injection pressure P. Since an increase of the injection pressure will increase the rate of fuel flow and the power output of the engine, it follows that the power output may be increased or decreased by moving the feed pipe 36 toward or away from the shaft 7. Decreasing the quantity $r_1$ also causes the fuel to enter more of the fuel inlet ports 30' to 35' and thus deliver more fuel to the combustion chamber, assuming of course that the cavity 28 contains less fuel than is shown in Fig. 3.

The increased delivery of fuel caused by moving the feed pipe 36 radially inwardly causes a greater amount of fuel to be delivered to the combustion chamber both because of the increased fuel injection pressure P and because of the fact that a decrease of the radius $r_1$ will allow the fuel to enter more of the nozzle inlet ports 30' to 35'. The increased flow of fuel will produce more heat in the combustion chamber and greater expansion of the gases therein. The larger volume of gas may be used to speed up the turbine and compressor somewhat but in addition will also operate to increase the engine thrust, because of the increased velocity of gas discharge from the nozzle 3. With an increased flow of fuel the turbine and compressor need not necessarily be speeded up in order to utilize the fuel properly, since there is always an excess of air over that required for complete combustion of the fuel. Thus if the engine is used in a propeller-jet unit the propeller, which would be driven by the main shaft 7, might be of the constant-speed type if desired. The excess of air generally considered necessary in a jet engine not only provides thrust effort when heated but also helps to prevent overheating of the engine, especially the turbine blades thereof.

The fuel delivery pump 43 may be of any suitable low-head type such as a centrifugal vane type or a gear pump, it being required only to overcome the resistance to fuel flow offered by the piping between the fuel tank and the fuel containing cavity 28. The pump 43 is preferably driven by any suitable power source, not shown. Once the normal operating speed for any installation has been determined, the pump speed need not be varied except in case the specific gravity of the fuel itself is changed. As long as the motor 25 is turning at a moderate speed the liquid fuel entering the cavity 28 from the feed pipe 36 will be retained therein by centrifugal force, and will feed into the nozzles by the same force along the passages, leading from the ports 30' to 35'. When the fuel is shut off or the supply thereof becomes exhausted, the fuel remaining in cavity 28 continues to feed to the nozzles 30 to 35 until the rotor cavity empties itself. In starting the engine the fuel feed pipe 36 is preferably supplied with a more volatile fuel such as gasoline through pipe 44a which will ignite readily by means of the spark plug 50. After the turbine and compressor are running smoothly the gasoline supply is turned off by manipulation of a suitable valve such as 44b and a supply of kerosene or other fuel oil is turned on to supply the engine during normal operation. Since the value of the constant $k$ in the equations stated above varies directly with the specific gravity of the fuel, it is evident that the fuel injection pressure will go up as the specific gravity of the fuel goes up. Thus when the kerosene or other fuel oil is substituted for the gasoline after the engine is started, the present fuel injection system will automatically produce an increased fuel injection pressure to atomize the heavier fuel to the same extent that the lighter starting fuel is atomized.

The embodiments of the invention herein shown and described are to be regarded as illustrative only and it is to be understood that the invention is susceptible to variations, modifications and changes within the scope of the appended claims.

I claim:

1. In a jet propulsion power unit, a cylindrical casing having an air intake at one end and a gas discharge nozzle at the other end, an air compressor in said casing adjacent to the intake end and having a rotor assembly mounted on a shaft extending through said casing centrally thereof, a gas turbine in said casing adjacent to the discharge end and having a rotor assembly mounted on said shaft, an annular air expansion chamber in said casing, means providing a plurality of concentric annular passages leading rearwardly from said compressor, an annular combustion chamber in said casing between said expansion chamber and said turbine, a fuel distributing rotor in said casing at the end of said combustion chamber adjacent to said expansion chamber and being mounted on said shaft, means providing an annular fuel containing cavity in said rotor, relatively stationary conduit means for feeding liquid fuel to said cavity from a fuel tank, means including a fuel pump for delivering liquid fuel to said relatively stationary conduit means at constant pressure, a plurality of fuel injection nozzles peripherally arranged on said rotor and being of different lengths so as to inject fuel directly into the zones of compressed air which issue from said plurality of concentric annular passages, and fuel passages provided in said rotor extending outwardly to connect said cavity with said fuel injection nozzles.

2. In a revolving fuel injection apparatus, a circular fuel distributing rotor including a disk and an annular wall member parallel to the disk and concentrically spaced therefrom, means integrally connecting the outer rim of said wall member to said disk to provide an annular cavity within said rotor adapted to retain a quantity of liquid fuel by centrifugal force upon continuous rotation of said rotor, a plurality of fuel injection nozzles peripherally arranged on said disk, a plurality of fuel passages provided in said disk extending radially outwardly in the median plane of said disk to communicate at the outer ends thereof with said fuel injection nozzles, and said fuel passages being connected by laterally extending passages to said annular cavity at varying radial distances from the axis of rotation of said fuel distributing rotor.

3. A revolving fuel injection apparatus comprising, a rotatable shaft adapted to be mounted within a combustion chamber, means for causing rapid rotation of said shaft, a fuel distributing rotor mounted on said shaft to turn therewith, a plurality of fuel injection nozzles peripherally arranged on said rotor, means providing an annular fuel containing cavity in said rotor with a circular opening leading into said cavity at one side of the rotor concentrically with respect thereto, a fuel feed pipe extending into said combustion chamber radially with respect to said rotor and adjacent to said one side thereof, said pipe having a fuel delivery portion extending laterally into said cavity through said circular opening with a reverse bend therein so as to extend radially outwardly to its free end within said cavity, means for adjusting the relative radial position of said fuel feed pipe, and fuel passages provided in said rotor extending from said fuel injection nozzles to said cavity and connecting with said cavity at varying radial distances from the axis of rotation of said fuel distributing rotor.

4. In a revolving fuel injection apparatus, a circular fuel distributing rotor comprising a disk rotatable about the central axis thereof, an annular wall member parallel to said disk and spaced uniformly therefrom in concentric relation to the disk, means providing an impervious connection between the outer periphery of said wall member and said disk to provide an annular fuel containing cavity within said rotor adapted to retain varying quantities of liquid fuel by centrifugal force upon continuous rotation of said rotor, a multiplicity of fuel injection nozzles peripherally arranged on said disk with said nozzles being arranged in successive groups characterized by having the nozzles of each group of varying radial length with respect to the central axis of said disk, said disk being provided with a separate fuel passage for each nozzle extending radially outwardly to connect said fuel containing cavity with the respective nozzles, and said disk being provided with lateral passages between said cavity and said fuel passages with the lateral passages corresponding to each group of nozzles being at uniformly varying radial distances from the central axis of said disk in order to distribute total quantities of fuel to said fuel injection nozzles in proportion to the degree of fullness of said annular fuel containing cavity.

5. In a revolving fuel injection apparatus as recited in claim 4, the fuel injection nozzles comprising each of said groups thereof being of progressively greater radial length with the nozzles of greatest radial length corresponding to the lateral passages of greatest radial distance from the central axis of said disk.

6. In a jet propulsion power plant including a cylindrical casing enclosing an air compressor and a gas turbine having directly coupled drive shafts, means providing an annular combustion chamber in said casing between said air compressor and said gas turbine, means providing a plurality of concentric annular passages between said air compressor and said combustion chamber, a fuel distributing rotor in said casing at the end of said combustion chamber adjacent to said annular passages, means rigidly mounting said rotor on the compressor drive shaft for rotation therewith, means providing an annular fuel containing cavity in said rotor on the side remote from said combustion chamber and said cavity being open throughout the inside circumference thereof, a radially adjustable fuel feed pipe extending into said casing between said fuel distributing rotor and said compressor and having a fuel delivery portion with a reverse bend therein so as to extend outwardly into said cavity to supply liquid fuel thereto, a plurality of fuel injection nozzles peripherally arranged on said rotor and being of different radial lengths measured from the central axis of said rotor so as to inject fuel directly into the zones of compressed air which issue from said plurality of concentric annular passages, and fuel passages provided in said rotor to connect said cavity with said fuel injection nozzles.

7. In a jet propulsion power plant as recited in claim 6, curved guide vanes arranged in each of said concentric annular passages with the degree of curvature of said vanes being least in the outermost passage and increasing in degree to the innermost passage.

8. In a jet propulsion power plant as recited in claim 6, curved guide vanes arranged in each of said concentric annular passages with the degree of curvature of said vanes being increased from the outermost to the innermost passage and with the direction of curvature being opposite to the rotational direction of said rotor.

9. In a jet propulsion power plant including a cylindrical casing enclosing an air compressor and a gas turbine having directly coupled drive shafts, means providing an annular combustion chamber in said casing between said air compressor and said gas turbine, means providing a plurality of concentric annular passages between said air compressor and said combustion chamber, a fuel distributing rotor in said casing at the end of said combustion chamber adjacent to said annular passages, means rigidly mounting said rotor on the compressor drive shaft for rotation therewith, means providing an annular fuel containing cavity in said rotor on one side thereof and said cavity being open throughout the inside circumference thereof, a radially adjustable fuel feed pipe extending into said casing adjacent to the side of said rotor including said cavity and having a fuel delivery portion with a reverse bend therein so as to extend outwardly into said cavity to supply liquid fuel thereto, a plurality of fuel injection nozzles peripherally arranged on said rotor and being of different radial lengths measured from the central axis of said rotor so as to inject fuel directly into the zones of compressed air which issue from said plurality of concentric annular passages, and fuel passages provided in said rotor to connect said cavity with said fuel injection nozzles.

10. In a jet propulsion power plant as recited in claim 9, said fuel passages being arranged in groups characterized by having their connections with said cavity at uniformly varying radial distances from the central axis of said rotor.

11. In a jet propulsion power plant as recited in claim 9, curved guide vanes arranged in each of said concentric annular passages with the degree of curvature of said vanes being least in the outermost passage and increasing in degree to the innermost passage.

12. In a jet propulsion power plant as recited in claim 9, curved guide vanes arranged in each of said concentric annular passages with the degree of curvature of said vanes being increased from the outermost to the innermost passage and with the direction of curvature being opposite to the rotational direction of said rotor.

13. A revolving fuel injection apparatus comprising, a fuel distributing rotor, means mounting said rotor for rotation about the central axis thereof and in close proximity to one end of an annular combustion chamber, means to cause rapid rotation of said rotor, means to supply compressed air to said combustion chamber, means to conduct said compressed air past the outer rim of said rotor and into said annular combustion chamber at said one end thereof, a plurality of fuel injection nozzles peripherally arranged on said rotor, means providing an annular fuel containing cavity in said rotor with a circular opening leading into said cavity at one side of the rotor concentrically with respect thereto, a fuel feed pipe extending inwardly at said one side of said rotor, said pipe having a fuel delivery portion extending laterally into said cavity through said circular opening with a reverse bend therein extending outwardly to its free end within said annular fuel containing cavity, means for adjusting the relative radial position of said fuel delivery portion with respect to the axis of rotation of said rotor, and fuel passages provided in said rotor extending from said fuel injection nozzles to said annular cavity and connecting with said cavity at varying radial distances from the axis of rotation of said rotor.

14. In a jet propulsion power plant including a cylindrical casing enclosing an air compressor and a gas turbine having directly coupled drive shafts, means providing an annular combustion chamber in said casing between said air compressor and said gas turbine, means providing a plurality of concentric annular passages between said air compressor and said combustion chamber, a fuel distributing rotor in said casing at the end of said combustion chamber adjacent to said annular passages, means mounting said rotor on the compressor drive shaft for rotation therewith, a plurality of fuel injection nozzles peripherally arranged on said rotor and being of different radial lengths measured from the central axis of the rotor so as to inject fuel directly into the zones of compressed air which issue from said plurality of concentric annular passages, means providing an annular fuel containing cavity in said rotor with a circular opening leading into said cavity at one side of the rotor concentrically with respect thereto, a fuel feed pipe extending inwardly at said one side of said rotor, said pipe having a fuel delivery portion extending laterally into said cavity through said circular opening with a reverse bend therein extending outwardly to its free end within said annular fuel containing cavity, means for adjusting the relative radial position of said fuel delivery portion with respect to the axis of rotation of said rotor, and fuel passages provided in said rotor extending from said fuel injection nozzles to said annular cavity and connecting with said cavity at varying radial distances from the axis of rotation of said rotor.

References Cited in the file of this patent

UNITED STATES PATENTS

| Number | Name | Date |
|---|---|---|
| 406,171 | Johansson | July 2, 1889 |
| 814,720 | Monroe | Mar. 13, 1906 |
| 1,853,682 | Hechenbleikner | Apr. 12, 1932 |
| 2,287,021 | Buck | June 23, 1942 |
| 2,294,313 | Mock | Aug. 25, 1942 |
| 2,416,389 | Heppner et al. | Feb. 25, 1947 |

FOREIGN PATENTS

| Number | Country | Date |
|---|---|---|
| 32,985 | Sweden | June 12, 1912 |
| 349,844 | Germany | Mar. 9, 1922 |
| 437,811 | Great Britain | Nov. 1, 1935 |